A. CRAIG.
GOLF CLUB.
APPLICATION FILED APR. 1, 1922.

1,429,569.

Patented Sept. 19, 1922.

INVENTOR
Alexander Craig
PER
Spear, Middleton, Donaldson & Hall
ATTORNEY

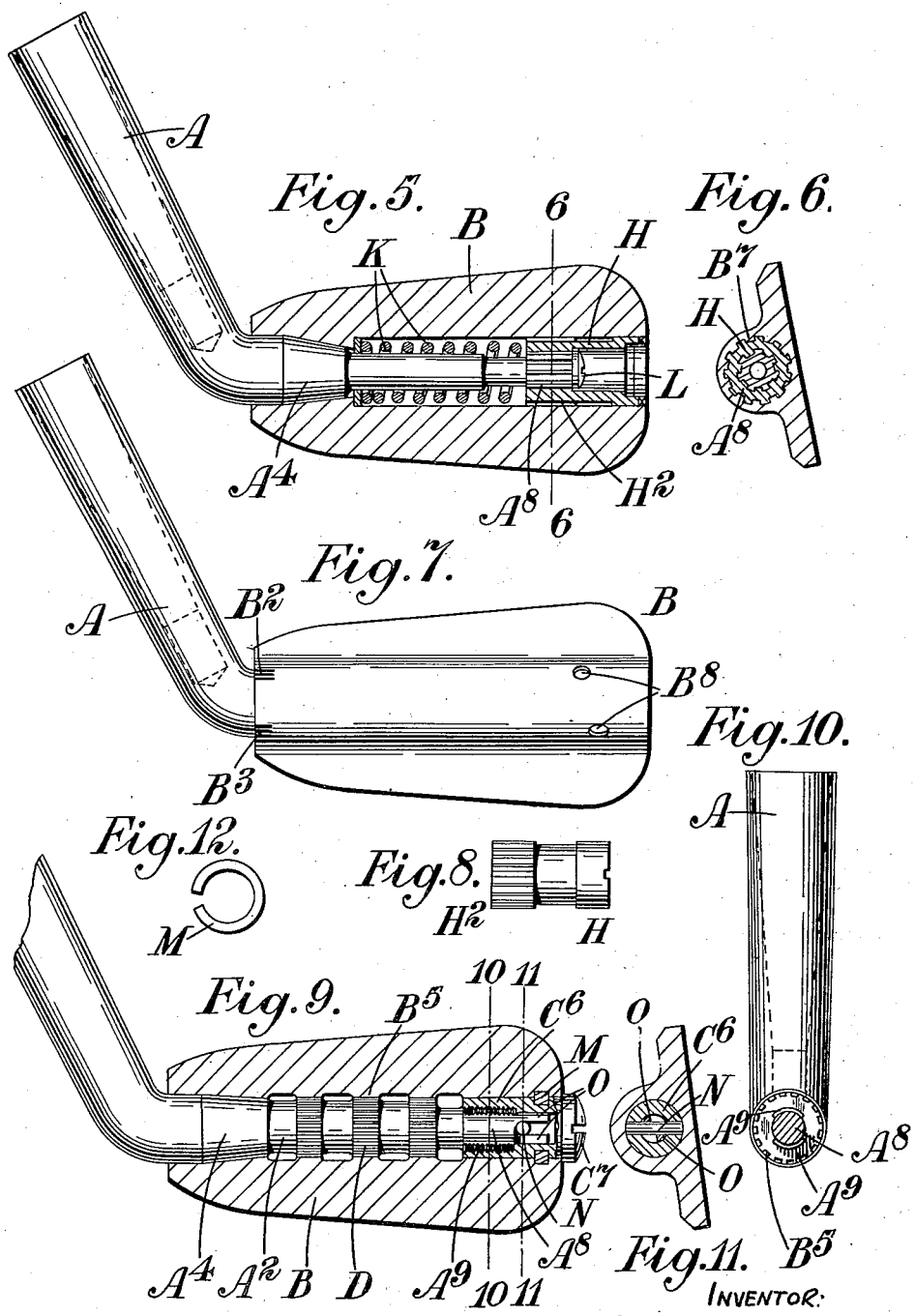

Patented Sept. 19, 1922.

1,429,569

UNITED STATES PATENT OFFICE.

ALEXANDER CRAIG, OF COVENTRY, ENGLAND.

GOLF CLUB.

Application filed April 1, 1922. Serial No. 548,822.

*To all whom it may concern:*

Be it known that I, ALEXANDER CRAIG, a subject of the King of England, residing at Coventry, in the county of Warwick, England, have invented certain new and useful Improvements in Golf Clubs, of which the following is a specification.

This invention relates to golf clubs of the kind in which the head is adjustable to vary the loft, being mounted to swivel about a shank which is integral with the socket to which the shaft is fitted, the shank extending through the head and carrying at its free end a locking device.

The object of the present invention is to provide a club of this kind which will be cheap and simple to produce and in which the head can be very easily adjusted.

In the accompanying drawings,

Figure 1 is a sectional side view of one construction according to this invention.

Figures 2 and 3, each by a similar view represent alternate constructions, and

Figure 4 is an end view of the head only.

Figure 5 is a sectional side view of a further modification.

Figure 6 is a cross-section of the same on the line 6—6 of Figure 5.

Figure 7 is a rear view of the same.

Figure 8 is a detail used therein.

Figure 9 is a sectional side view of another construction embodying the invention.

Figure 10 is a cross-section of the same on the line 10—10 of Figure 9 with the locking nut and head removed.

Figure 11 is a similar section, looking in the opposite direction, on the line 11—11 of Figure 9, and Figure 12 is a view of a detail used in this embodiment of the invention.

Like letters indicate like parts throughout the drawings.

Figure 1:
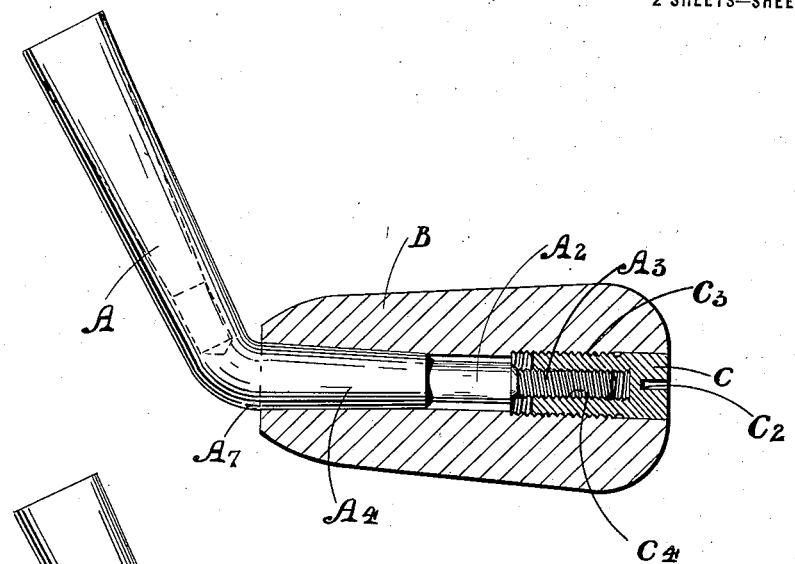

Referring first to Figure 1, the metal socket A into which the shaft is fitted is provided with a stem $A^2$ which projects at a suitable angle to suit the lie of the club, and this stem constitutes the shank upon which the head B is mounted. The extremity of the shank is threaded at $A^3$ to receive the locking device constituted by the nut C, and the other end is formed with a plain taper at $A^4$, the taper being preferably that used on Morse drills, which is simple and cheap to produce.

The head B, which is preferably of solid metal, is bored endwise to fit upon the shank, and one end of the bore tapers to fit on the taper portion $A^4$. When so fitted, and after the nut C has been tightened up, the head will not twist about the shank until the nut is slacked off, which may be done by means of a screw driver or key for which a slot or the like $C^2$ is provided. The head can thus be twisted to alter the loft of its face, and, if desired, marks or graduations as shewn at $B^2$ and $B^3$ (Figure 4) may be formed upon the end face of the head and at $A^7$ on the adjacent part of the shank, so as to facilitate setting of the head at certain definite angles.

Preferably the nut C has a screw thread engagement on its outer surface $C^3$ with the head B as well as an interior thread $C^4$ engaging the shank, and these threads are of different pitches or of opposite sense, so that the action of turning the nut pushes the head on and also draws it off the taper shank. The nut thus functions as a withdrawing device as well as a locking one.

The head B may be of roughly triangular section with the shank passing through the thickest part $B^3$, and on either side of this part the head may be lightened at $B^4$ by grooving, drilling lengthwise, or other means.

Figure 2:
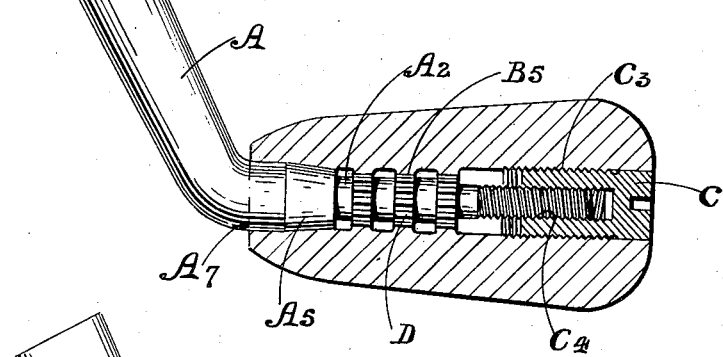

In the modified construction illustrated by Figure 2, the shank and the head have a direct splined engagement with one another as well as that provided by the tapered parts. The parallel splines D upon the shank $A^2$ engage corresponding splines $B^5$ formed in the bore of the head, and these splines are disengaged by an axial movement of the head upon the shank which is provided for by the nut C, the threads of which $C^3$ and $C^4$ are preferably right and left handed respectively to minimize the number of turns required to disengage the splines. Preferably the splines are arranged in a plurality of rows, as shown, in order chiefly to enable the head to be disengaged from the shank with only a small endwise movement.

As will be seen, the nut is thus adapted to act positively on the head both in the engaging and disengaging movements. To facilitate the axial movement, working clearance is provided in the splined connection but this is taken up when the head is thrust into engagement with the tapered portion of the shank.

The splining is preferably so arranged that adjustment of the loft of the head can be made in increments of ten degrees, these being the usual amounts of variation in practice, but obviously, if desired, they may be adapted to a greater or lesser amount as may be most convenient. The splines therefore serve as an indexing device.

Figure 3:
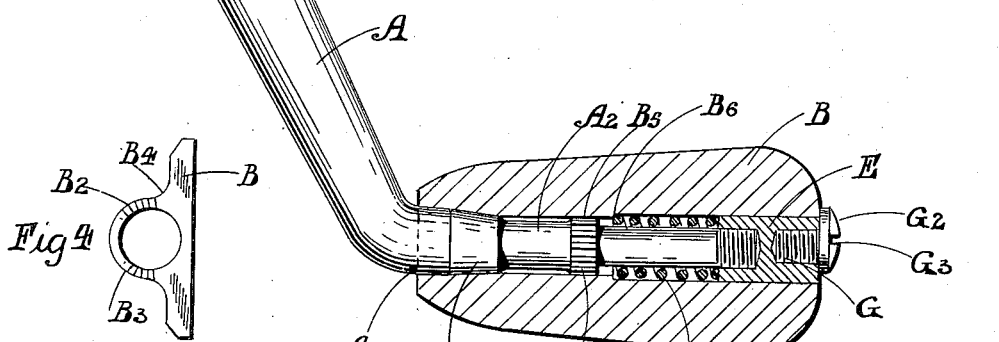

If desired, the retaining device at the end of the shank $A^2$ may have a threaded engagement with the shank only, its outer periphery being cylindrical and closely fitting the bore of the head B so that it is free to slide therein. The retaining device is shown at E (Figure 3) and is adapted to form an abutment for a compression spring F which at its other end bears against a shoulder $B^6$ formed in the bore of the head thereby to thrust the head against the taper shoulder $A^5$ and to retain the splined portions D and $B^5$ in engagement. With this arrangement in adjusting the loft of the head it is merely necessary to pull the head B along the shank against the pressure of the spring F to disengage the splined portions, after which the head may be rotated to the desired extent, and when released it will spring back re-engaging the taper and the splined portions. By this means the use of a key or screw driver for making adjustments is avoided.

To avoid any risk of the head B moving along the shank accidentally during a stroke, and thus becoming disengaged, any convenient securing device may be employed. For example, a screw G with a head $G^2$ eccentric to its shank may be tapped into the retaining device E eccentrically to the latter's periphery. The head $G^2$ is of the same diameter as the device E (or is slightly smaller), and the two eccentricities are of the same magnitude, so that in one angular position of the screw G its head will clear the bore of the head B, and permit the latter's axial movement, and in another angular position of the screw G (i. e. when set up firmly), its head partly overlaps the bore and thus secures the head of the club against axial movement. A slot $G^3$ may be provided in the head of the screw for engagement by a coin or the like instead of a screw-driver.

The construction shown in Figures 5 to 8 enables a very fine adjustment of angle to be obtained. In this case, instead of the head having a direct splined engagement with splines on the shank, there is an intermediate splined member H. This has internal splines which engage with corresponding ones $A^8$ on the stem. In the construction illustrated seven of such splines are used. Externally the sleeve H is formed with splines $H^2$, shown as eleven in number, which mesh with corresponding splines $B^7$ in the head. The sleeve H is pressed by a spring K up against a stop constituted by a washer kept in place by the setscrew L.

To obtain a different angle of loft, the sleeve H is pushed inwards against a spring K, for which purpose a suitable key may be used, and then the head is set to the desired angle and the sleeve H meshed with the corresponding internal and external splines. As the number of the internal splines is different from the external ones, a Vernier type of adjustment can be obtained so that a very fine setting can be effected. To facilitate correct adjustment of the sleeve to obtain any desired setting, peep holes $B^8$ may be formed in the back of the head which may expose a certain part of the sleeve H which may bear numbers or other marks facilitating the operation of the sleeve. One of the holes $B^8$ is employed when the club is used for right hand shots and the other for left hand shots.

In the construction shown in Figures 9 to 12, a plurality of rows of splines is used on the shank, and the locking nut $C^6$ in this case has an interrupted thread connection with the shank. Thus the end $A^8$ of the shank is formed at two points with the threads $A^9$ and the interior of the nut $C^6$ has similar threads which engage therewith in the manner of a breech block of a gun. The end of the nut is formed with a nick $C^7$ for the engagement of a screw-driver, coin or the like, and the nut is formed with a groove, as also is the head, and in the two grooves lies an expanding ring M which keys the head and the nut together as far as longitudinal movement is concerned. Thus rotation of the nut in one direction, when the threads are in engagement, pushes the head on to the shank, and rotation in the other direction draws the head away from the taper $A^4$, freeing the frictional lock between the head and the shank and allowing the head to be drawn right off the shank as soon as the interrupted threads disengage one another.

To limit the relative rotation of the nut on the shank, the former may carry a cross-pin N engaging horns O formed at the end of the shank.

Preferably the shank, stem, and the head, as well as the nut, are made of a rustless steel, but obviously other non-rusting materials may be used.

It will be seen that by this invention a very simple and cheap form of club with adjustable head is provided.

What I claim as my invention and desire to secure by Letters Patent of the United States is:—

1. In a golf club, the combination of a shank, a socket integral therewith for receiving the shaft, a plain taper on said shank, a readily removable head, a plain taper bore to said head engaging said taper on said shank, a locking device carried by the outer end of said shank and adapted to act upon said head and hold said tapers in engagement at any angle, substantially as set forth.

2. In a golf club, the combination of a shank, a socket integral therewith for receiving the shaft, a plain taper on said shank, a head, a plain taper bore to said head engaging said taper on said shank, a splined engagement between said shank and said head, and a locking device carried by the outer end of said shank and adapted to act upon said head and hold said tapers and said splines in engagement, substantially as set forth.

3. In a golf club, the combination of a shank, a socket integral therewith for receiving the shaft, a plain taper on said shank, a head, a plain taper bore to said head engaging said taper on said shank, a plurality of rows of splines on said shank, corresponding rows of splines in said bore adapted to engage said rows of splines on said shank, and a nut screwing on said shank and also engaging as regards movement in both axial directions with said head, substantially as set forth.

4. In a golf club, the combination of a shank, a socket integral therewith for receiving the shaft, a plain taper on said shank, a head, a plain taper bore to said head engaging said taper on said shank, a plurality of rows of splines on said shank, corresponding rows of splines in said bore adapted to engage said rows of splines on said shank, an interrupted screw thread on said shank, a breech nut engaging therewith, a groove in said nut, a groove in said head and an expanding ring engaging both of said grooves, substantially as set forth.

In testimony whereof I have signed my name to this specification in the presence of two subscribing witnesses.

ALEX. CRAIG.

Witnesses:
 CHAS. J. BECKER,
 ANNIE L. WADE.